Patented Apr. 5, 1932

1,852,547

UNITED STATES PATENT OFFICE

PAUL R. WHELAN, OF ST. LOUIS, MISSOURI

METHOD OF MANUFACTURE OF PORTLAND CEMENT

No Drawing.   Application filed April 11, 1928. Serial No. 269,298.

This invention relates to a new and useful method and product of manufacture of Portland cement, and has particular reference to a high lime Portland cement containing more than 69 percent by weight of lime, or the molecular equivalent thereof of other dioxides, such as, for example, magnesia.

Preferably I produce the high lime cement by forming a fluid compound of calcareous and argillaceous materials, heating said compound substantially above its temperature of liquefaction, and then suddenly cooling the melt.

Heretofore, Portland cement has been manufactured by calcining, at a high temperature, limestone in intimate mixture with argillaceous material. To secure the intimate mixture necessary, the materials are pulverized to a very fine consistency and mixed thoroughly by mechanical means before introduction into the kiln.

The limestone, $CaCO_3$ (disregarding impurities) is reduced first under the heat to lime (CaO) and $CO_2$, the carbon dioxide being driven off as a gas. The lime reacts with the silica and alumina in the clay, forming various silicates and aluminates of calcium, of which we note the following: $3CaO.SiO_2$, $2CaO.SiO_2$, $CaOSiO_2$, and possibly other calcium silicates; $3CaO,2Al_2O_3$, $2CaOAl_2O_3$, $CaOAl_2O_3$ and possibly other calcium aluminates.

The composition of American true Portland cement varies within the following limits: $SiO_2$, 19.5 to 24.5 percent; $Al_2O_3$, 4.1 to 10.1 percent; $Fe_2O_3$, 1.6 to 5.2 percent; CaO, 59.5 to 65 percent; MgO, 0.3 to 3.5 percent; and others, 0.4 to 3.2 percent.

Heretofore the aim in the manufacture of Portland cement has been to produce as much of the lime as a tri-calcium salt of silica, $3CaO.SiO_2$ as possible. In ordinary Portland cement the compound is associated with alumina and a small proportion of other RO and $R_2O$ oxides and sesquioxides to form what is called the "Alite crystal".

Other investigators have shown that a typical analysis of "Alite crystal" as found in Portland cement is as follows: RO, 70.71% $R_2O_3$, 5.75%; $SiO_2$, 23.54%. (In this analysis, RO may be CaO, MgO, or other like oxides; and $R_2O_3$ may be $Al_2O_3$, $Fe_2O_3$, or other sesquioxides).

It has, in the past, been thought to be impossible to secure the necessary reactions in a kiln with complete fusion of the materials. There have been two obstacles to this, the first one being the fact that the alite crystal is partially broken down at the point of fusion, leaving free lime, and the second the intense heat required. The temperature, therefore, sought for in present manufacture is a temperature just sufficient to bring the material to incipient fusion only, which temperature varies considerably with the different materials employed, owing to the impurities, but may be stated to be around 2500° F. to 2700° F.

With the temperature stated, the optimum amount of alite crystal is not obtained, the charge is never liquefied, and every effort is made to prevent fusion in order to avoid "over-burning" the cement. Under these practices, with prolonged heating of the intimately mixed pulverized charge, at the temperature of incipient fusion, a content of 68 percent combined lime, or equivalent oxide, may be stated to be the maximum that has been obtained.

The combination of lime and silica to form tricalcium silicate cannot be made complete when the materials are in the solid state. The formation of the dicalcic salt ($2CaO.SiO_2$) is 99% complete in thirty minutes at 1425° C., (using silicic acid), but the tricalcic salt ($3CaO.SiO_2$) is combined only to the extent of 70% in thirty minutes at 1540° C., while 99% clinker may be made from commercial materials in 15 minutes at 1424° C., hence such latter clinker must contain a large percentage of the dicalcic salt.

It appears that, at the point of liquefaction, the tricalcium silicate, already formed just under the point of liquefaction, condenses to the dicalcium silicate and free lime.

Now I have found that this free lime will dissolve and reassociate to form the tricalcium silicate if the temperature of the charge be raised a certain degree above the liquefaction temperature.

By thus superheating the fused compound, I have produced a Portland cement, from the materials ordinarily used, having, for example, a composition as follows: $SiO_2$, 23.5%; $Al_2O_3$, 3.2%; CaO, 70.5%; loss 2.8%. (The molecular equivalent of other sesquioxides counted as $Al_2O_3$, and of other RO oxides, as CaO).

Such a Portland cement is sound, that is, it has no free lime, and when made into 1:3 sand briquettes and tested gave tensile strengths, in lbs. per sq. inch, as follows: 1 day, 265; 2 days, 345; 7 days, 540; 28 days, 630.

Limestone, $CaCO_3$ has the property of decrepitating with extreme rapidity at high temperatures. At a temperature of 2000° F., or over, this decrepitation is so rapid as to be explosive. I may take advantage of this fact to granulate the lime at the same time that the carbon dioxide is expelled. In this case the granulated lime is momentarily suspended in the furnace gases, which burn on the lime particles and bring them to a high degree of incandescence.

The lime particles may then be impinged on a body of clay that has been fettled or otherwise introduced into the marginal portion of the body of incandescent lime particles, the product of the combination of the lime and clay being subjected to the radiation from the incandescent lime in the interior of the body of granulated lime.

To obtain the high temperature required for my process, I take advantage of the property of lime to become very highly incandescent in the presence of a burning combustible. As lime is one of the constituents of the charge, I obtain this effect in a very simple and economical manner.

If I desire to use lime instead of limestone, I may provide a body of granular incandescent lime, in the interstices of which I burn a combustible, and I fettle the margin of said body with the argillaceous material. Thus the combination of the lime and clay takes place in a region adjacent to the incandescent lime particles. I may preferably accomplish this by passing a stream of lime particles through the flame, and then impinging the incandescent lime on the clay as hereinbefore set forth or, I may blow granular clay into the marginal portions of said incandescent lime with the air for combustion, or I may fettle the clay around the body of incandescent lime particles. In either case the intense radiation from the incandescent particles brings the product of the combination of the lime and clay to the degree of temperature required for my process.

Other forms of my invention may comprise obtaining the temperature necessary by combustion under pressure or, by combustion using air fortified with oxygen.

The object of this invention, therefore, is to produce a Portland cement of high combined lime content, by a simple yet effective and economical process. Further objects will appear from the following description.

Briefly, the invention consists in providing the combining ingredients of a Portland cement in the form of discrete bodies of, respectively, a relatively refractory calcareous material and a relatively fusible argillaceous material, the calcareous material being incandescent and in preponderant relation to the argillaceous material; bringing a combustible from a source extraneous to either of said bodies into combustion accelerating relation with the calcareous body which with its margins defines a zone of combustion; and fusing and causing the combination of the argillaceous material with one part or the margins of said calcareous body in the presence or environment of the radiant heat emanating therefrom while burning the combustible in the other part of said calcareous body for maintaining the incandescence thereof; the argillaceous material being brought into combining relation with the calcareous material under conditions determined by the temperature there prevailing, said temperature being, moreover, substantially above the temperature of liquefaction of the product, for superheating the same while in its liquid state; this product being then removed and prepared for use in the usual manner, as will later appear.

For the purpose of illustrating my improvement in the method and product of manufacture of Portland cement, I will describe, for example, one form of my invention, as follows:

The calcareous material, as lime and magnesia, may be provided in the form of carbonates (limestone or dolomite). For the argillaceous material I prefer to employ an alumino-silicate, such as feldspar, having a high ratio of silica to sesquioxide, as for example, more than 5:1; but I do not wish to be limited to such clays, as ordinary clays and shale and quartz may be used satisfactorily.

A suitable limestone may have the following composition: CaO, 53.74%; MgO, 0.17%; $SiO_2$, 3.14%; $Fe_2O_3$, 0.18%; $Al_2O_3$, 0.32%; $P_2O_5$, 0.006%; S, 0.001%.

A suitable clay may have the following composition: $K_2O$, 13.70%; $Na_2O$, 2.02%; CaO, 0.23%; MgO, 0.10%; $Al_2O_3$, 19.20%; $Fe_2O_3$, 0.23%; $SiO_2$, 64.30%. This aluminosilicate has a ratio of 5.6 silica to 1 of sesquioxides.

The charge to the furnace may therefore comprise, as an example, in lbs. per bbl. of product: (carbonates) (CaO—274.2 lbs.; $CO_2$—216.5 lbs.; MgO—0.9 lbs.; $Fe_2O_3$—0.8 lb.; $Al_2O_3$—1.5 lbs.; $SiO_2$—1.6 lbs.; total 495.5 lbs.: (clay) $SiO_2$—76.2 lbs.; $Fe_2O_3$—

0.4 lbs.; $Al_2O_3$—20.4 lbs.; $K_2O$—14.6 lbs.; $Na_2O$—2.1 lbs.; total 113.7 lbs.

In percentages, such a charge will comprise, carbonates, 80.75%; silica 12.75%; sesquioxides, 3.80%; others 2.70%.

The limestone which preferably has been previously crushed to an egg size, is introduced into a suitable furnace or kiln, and a combustible, or the flame thereof, is directed against the material. This flame may be produced by using a fuel such as hydrocarbon gas, liquid petroleum, powdered coal with air, or a mixture of petroleum and powdered coal.

The heat decrepitates the limestone and reduces it to lime with explosive rapidity as it reaches the region of highest temperatures. Thus the flame is directed into a body of granulated lime particles or lumps and renders them highly incandescent, a phenomenon known as "limelight"; and this incandescence greatly accelerates the combustion and concentrates it just where the heat is desired, so that the temperature at the point desired for fusion is well up to that required for the purposes here described.

The clay may preferably be crushed to pass a 1½ inch roll crusher, and fettled around the upper margin of the body of the incandescent lime particles as by being introduced through the walls of the kiln just above the melting zone or region of high temperature. The clay is easily fused and trickles down around the outer margin of the incandescent lime body. The particles of lime come in contact with the clay and the intense radiant heat brings the products of combination of the lime and clay to a very high degree of temperature.

The point of complete fusion depends upon the amount of what may be loosely termed foreign matter in the limestone and clay, such as, for example, $Fe_2O_3$. It is, however, in the neighborhood of 3000° F. A temperature of some 300° F. in excess of the fusion temperature results in the formation of reassociation of the tricalcium silicate so that the lime is in combined form and the optimum quantity of lime is combined as a tricalcic salt.

An explanation of this is that probably the tricalcium silicate is unstable only in a metastable region existing between two points, that somewhat above the fusion temperature on one hand, and that somewhat below the fusion temperature on the other. That is to say, tricalcium silicate is a monotropic substance existing in a metastable region at liquidus temperature.

The extent of this combination is, therefore, dependent upon the temperature attained. The silicate degree of the product obtained is strictly a function of the temperature of fusion, and in the presence of an excess of lime the clay will all combine with the optimum amount of lime corresponding to a given temperature. Thus the control of the process lies in the control of the temperature, and I avoid the necessity of elaborate methods of control of the mixture of lime and clay, before burning, as heretofore practised.

I may, if desired, use lime itself instead of limestone. The lime may be prepared in a separate kiln, or the gases of combustion from incandescent lime may preferably be passed through a body of limestone to drive off the $CO_2$ and reduce the limestone to lime. The resulting body of lime may be a continuation of the incandescent body of lime and a source of supply of lime to the hearth of the furnace.

In either case, I heat the air for combustion with the heat in the gases of combustion rising from said body of incandescent lime, so as to cool said gases to effect economy of fuel, and to bring the gases to a suitable initial decarbonating temperature, preferably about 1200° F.

If lime is used as a charge to the furnace, the process remains the same as heretofore described, inasmuch as the clay contacts with the marginal particles of lime to combine with the same, and the lime so used up is replaced by fresh lime from the source of supply, which lime is heated to incandescence as before and is then combined with the clay, and so the process continues.

The body of lime, as such, remains stationary, but the particles composing it are constantly being used up, and new particles take their place. Thus the process is continuous.

The product in a fused state is collected on the hearth of the kiln and withdrawn therefrom. To avoid dissociation during cooling, the fused mass may be suddenly quenched as by bringing it in contact with a stream of water. The chilled melt is comminuted by the sudden cooling, and, after quenching, the comminuted materials are pulverized mechanically to a commercial consistency, 90% passing through a No. 200 sieve.

If there is considerable $Fe_2O_3$ in the raw materials, metallic iron may be found in the resulting product to an objectionable degree. This may be separated out by gravity concentration tables well known in the metallurgical art or by magnets passed over the material before or after the finish grinding.

A final product may be obtained, with proper temperatures, from the raw materials set forth hereinbefore, having a molecular composition of 21.9 $CaO.1Al_2O_3$. 6.3 $SiO_2$ and a composition by weight as follows: CaO, 71.55%; MgO, 0.25%; $SiO_2$, 22.12%; $Fe_2O_3$, 0.31%; $Al_2O_3$, 5.76%. Under these conditions, the lime combines with the silica and alumina in the molecular proportions of three moles of lime to each mole of alumina and silica.

It will thus be seen that the invention accomplishes its purposes. There is produced a better Portland cement than it has been possible heretofore to produce, and by a process and apparatus which is economical and easy to operate.

It is to be understood that the chemical formulæ and reactions are inserted herein for explanation only, and while they are accepted by the best authorities on the subject, they are merely theory and this invention is not dependent upon the literal correctness of such theory or theories.

It is to be further understood that the temperatures given here are illustrative and comparative only and are not intended to be technically accurate, which is impossible owing to the fact that these temperatures vary with the raw materials used, and in any event are difficult of ascertainment.

It is obvious that various changes, other than those specifically pointed out, may be made in the details of the process without departing from the spirit of this invention; it is to be understood, therefore, that this invention, within the scope of the claims, is not limited to the specific details of the process described.

I claim:

1. The method of manufacture of Portland cement from lime and argillaceous materials, which comprises heating the lime separately from the argillaceous material until the moment of combination then introducing the argillaceous material into contact with the heated lime and forming a fluid compound having more than 69% combined lime and equivalent RO oxides.

2. The method of manufacturing Portland cement which comprises heating lime to incandescence, bringing the incandescent lime in contact with argillaceous material, melting the argillaceous material to form a fluid compound with the lime, super-heating the fluid compound above its liquefaction temperature, and removing said fluid compound from contact with said lime.

3. The method of manufacturing Portland cement which comprises directing and burning a combustible in the interstices of a granular body of lime, bringing the lime to incandescence, bringing the incandescent lime in contact with argillaceous material, melting the argillaceous material to form a fluid compound with the lime, super-heating the fluid compound above its liquefaction temperature, and removing said fluid compound from contact with said lime.

4. The method of manufacturing Portland cement which comprises heating lime to incandescence, bringing the incandescent lime in contact with argillaceous material, melting the argillaceous material to form a fluid compound with the lime, super-heating the fluid compound above its liquefaction temperature, forming a fluid product having a combined lime content of more than 69%, and regulating the said lime content by regulation of the degree of said superheat.

5. The method of manufacturing Portland cement which comprises directing and burning a combustible in the interstices of a granular body of lime, bringing the lime to incandescence, bringing the incandescent lime in contact with argillaceous material, melting the argillaceous material to form a fluid compound with the lime, removing said fluid compound from contact with said lime, and suddenly cooling said compound.

6. The method of manufacturing Portland cement which comprises heating lime to incandescence, bringing the incandescent lime in contact with argillaceous material, melting the argillaceous material to form a fluid compound with the lime, super-heating the fluid compound above its liquefaction temperature to form a fluid product having a combined lime content of more than 69%, regulating the said lime content by regulation of the degree of said superheat, removing said fluid product from contact with said lime and suddenly cooling said fluid product.

7. The method of manufacturing Portland cement which comprises directing into and burning a combustible in the interstices of a granular body of lime, bringing the lime to incandescence at a temperature greater than 2800° F., bringing an argillaceous material into contact with said incandescent lime, forming a fluid product of combination of said lime and said argillaceous material, discharging the gases of combustion from said body of lime and heating the air for combustion with the heat in said gases.

8. The method of manufacturing Portland cement which comprises directing into and burning a combustible in the interstices of a granular body of lime, fettling argillaceous material at the margin of said body, combining the lime and argillaceous material at a temperature substantially greater than the temperature of liquefaction of the compound of said lime and argillaceous material, producing a superheated fused compound containing combined lime and its equivalent RO oxides in excess of 69%, and removing said fused compound from said body of lime.

9. The method of manufacturing Portland cement which comprises continuously forming a body of granular incandescent lime by decarbonation of limestone in the presence of a combustible directed into and burning in said body of lime, introducing an argillaceous material into the marginal portion of said body of lime, fusing said argillaceous material in contact with the marginal portions of said body of lime, heating the resulting compound above its temperature of liquefaction to form a fluid product, and removing said fluid product from contact with said body of lime.

10. The method of manufacturing Portland cement from argillaceous and calcareous materials, which comprises separately crushing the materials to substantially egg size, decarbonating the crushed calcareous material in the presence of heat to produce an incandescent lime body, introducing and fusing the argillaceous material at the margin of said lime body to form a fluid compound, superheating said compound substantially above its temperature of liquefaction, and removing said superheated fluid compound from said lime body.

11. The method of manufacturing Portland cement which comprises continuously forming a body of granular incandescent lime in the presence of a combustible directed into and burning on said body of lime, introducing an argillaceous material into the marginal portion of said body of lime, fusing said argillaceous material in contact with the marginal portions of said body of lime, heating the resulting compound above its temperature of liquefaction to form a fluid product having more than 69% of combined lime and equivalent RO oxides, removing the fluid product from contact with said body of lime, and suddenly cooling said fluid compound.

12. The method of manufacturing Portland cement which comprises continuously forming a body of granular incandescent lime by decarbonation of limestone with the escaping gases of combustion from a combustible directed into and burning in said body of lime, introducing an argillaceous material into the marginal portion of said body of lime, fusing said argillaceous material in contact with the marginal portions of said body of lime, heating the resulting compound above its temperature of liquefaction to form a fluid product having more than 69% of combined lime and equivalent RO oxides, removing the fluid product from contact with said body of lime, and suddenly cooling said fluid compound.

13. The method of manufacturing Portland cement which comprises decarbonating limestone to form a body of granular lime, bringing said body of lime to incandescence by directing into and burning a combustible in the interstices of said granular lime, fettling argillaceous material at the margin of said incandescent lime, bringing said argillaceous material into contact with said incandescent lime, fusing said argillaceous material, combining said fused material with said lime at the point of contact, heating the resulting compound above its temperature of liquefaction to form a fluid product having more than 69% of combined lime and equivalent RO oxides, removing said fluid product from contact with said lime body, and suddenly cooling said fluid product.

14. The method of manufacturing Portland cement from limestone and argillaceous material which comprises decarbonating limestone and heating the resulting lime separately from the argillaceous material to form a body of incandescent lime, then introducing and fusing argillaceous material in the presence of said incandescent lime, combining the fused argillaceous material with a portion of the lime to form a liquid product, superheating said product above its temperature of liquefaction, and removing said product from said body of lime.

15. The method of manufacturing Portland cement from lime and argillaceous material, which comprises heating the lime separately from the argillaceous material until the moment of combination, fusing the argillaceous material in the presence of the lime, combining the fused argillaceous material with the lime, and heating the resulting compound to a temperature substantially above the temperature of liquefaction of said compound.

16. The method of manufacturing Portland cement from lime and argillaceous material, which comprises heating the lime separately from the argillaceous material until the moment of combination, fusing the argillaceous material in the presence of the lime, combining the fused argillaceous material with the lime, and heating the resulting compound to a temperature substantially above the temperature of liquefaction of said compound and suddenly cooling said compound.

17. That process which consists in providing discrete bodies, respectively, of a relatively refractory incandescent substance and a relatively fusible substance, bringing a combustible into combustion accelerating relation with the refractory body, and causing the fusible body to combine with one part of the refractory body while burning the combustible in the other part of said refractory body.

18. That process for the production of a fused product which consists in providing the combining ingredients as discrete bodies, respectively, of calcareous and argillaceous materials, the calcareous body defining with its margins a zone of combustion, burning a combustible in said combustion-zone for creating an environment of radiant heat, and combining the argillaceous material with marginal portions of said calcereous body in the presence of said radiant heat.

19. That process which consists in providing discrete bodies respectively of calcareous material and argillaceous material, the calcareous body being maintained in a state of incandescence and in preponderant relation to said argillaceous body, and fusing the latter in the presence of the former for forming a product of combination thereof.

20. That process of combining calcereous and argillaceous materials which comprises providing said materials respectively in discrete bodies, the calcareous material being incandescent and in preponderant relation to said argillaceous material, and fusing the latter in contact with the former for forming a product regulated by the temperature there prevailing.

21. That process which consists in fusing argillaceous material in the presence of a preponderant body of calcareous material under temperature conditions substantially above the temperature of liquefaction of the product for superheating the same while in its liquid state for causing the said product to contain its optimum content of calcareous material.

22. That process of combining calcareous and argillaceous materials, which comprises providing the calcareous material in preponderant relation to the argillaceous material, fusing the latter in contact with the former at a temperature sufficiently above the temperature of liquefaction of the product to cause the same to contain an optimum content of calcareous substance, and then removing said product from said calcareous body.

23. The method of manufacture of Portland cement which comprises providing an argillaceous material having a silica to sesquioxide molecular ratio more than 5:1, bringing said argillaceous material in contact with incandescent lime, and forming a fluid product of combination of said lime and said argillaceous material.

In testimony that I claim the foregoing I hereunto affix my signature.

PAUL R. WHELAN.